United States Patent Office 2,943,545
Patented July 5, 1960

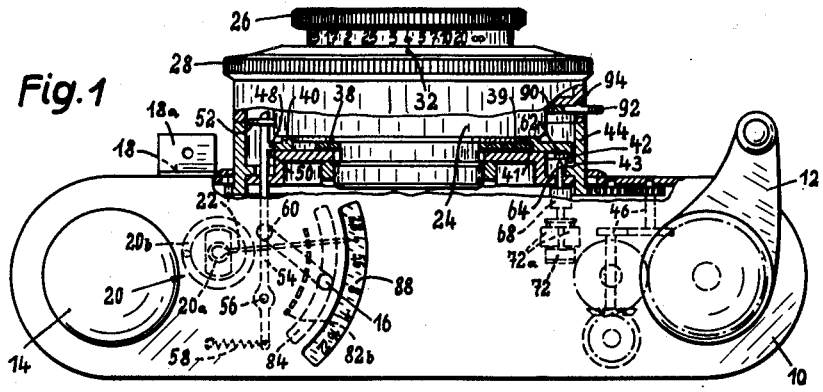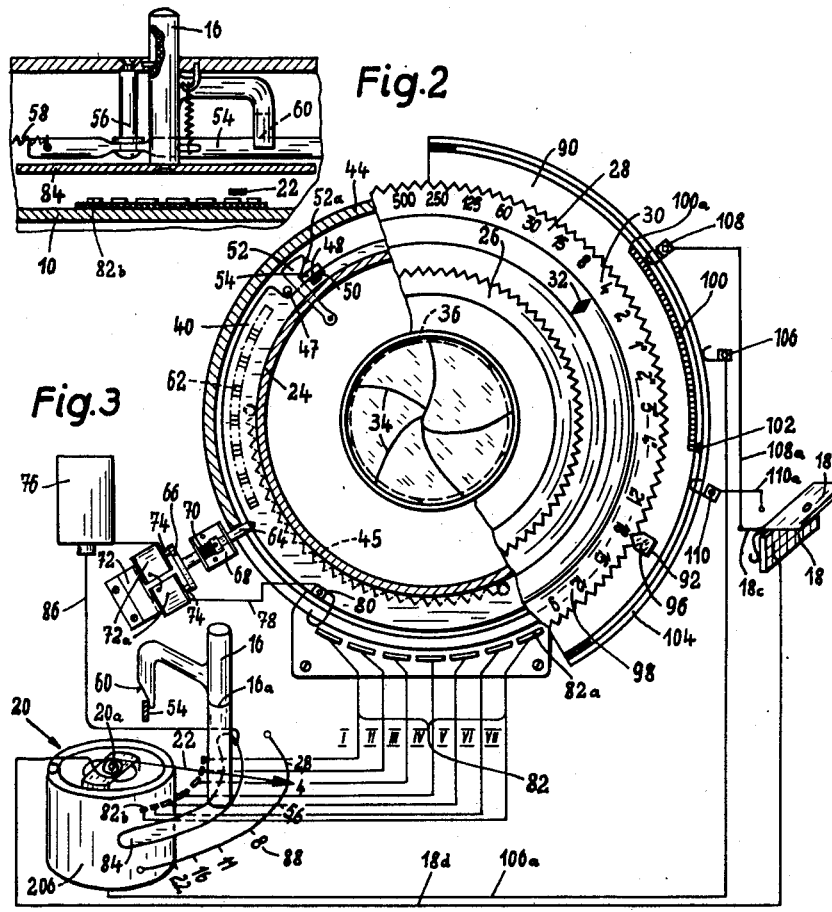

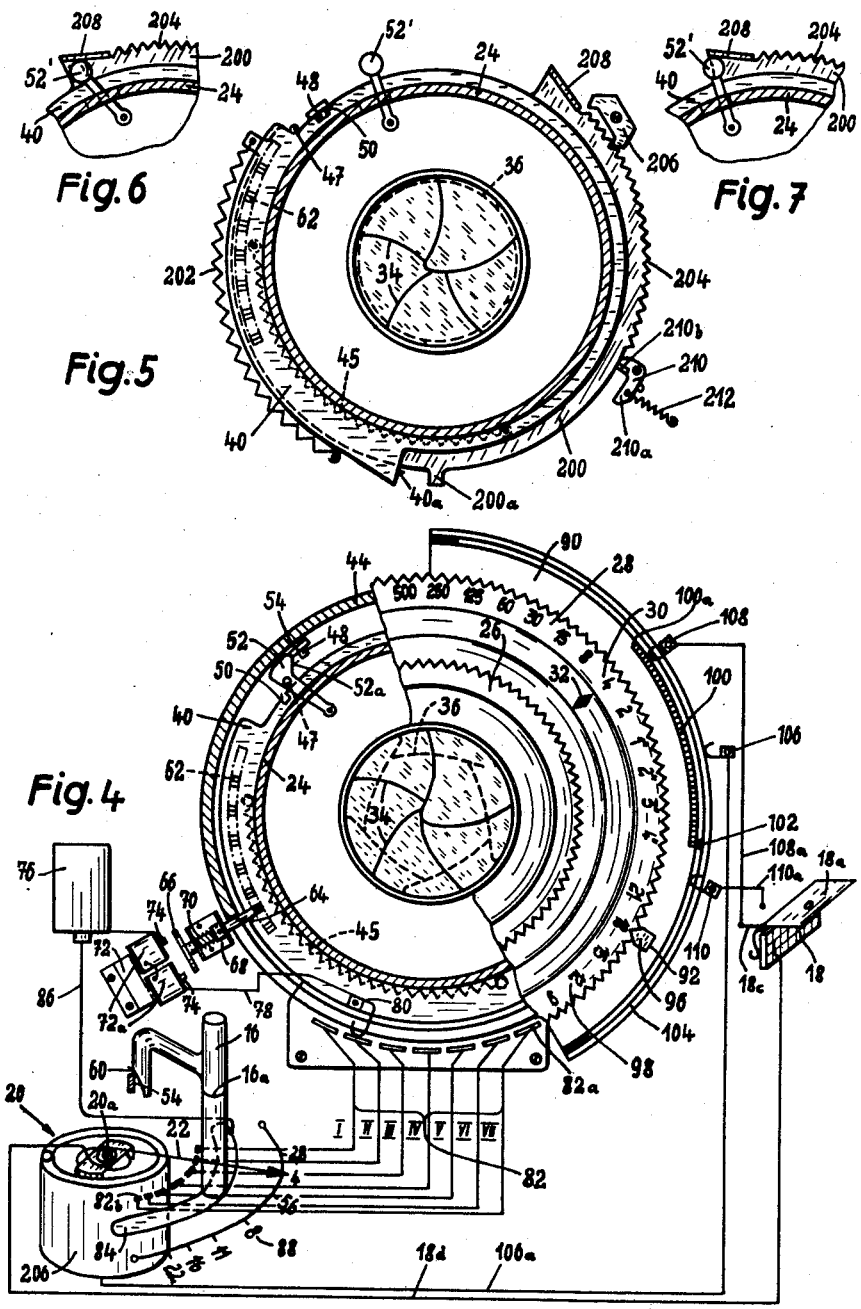

2,943,545

PHOTOGRAPHIC CAMERA WITH AUTOMATIC EXPOSURE SETTING

Paul Fahlenberg, Baierbrunn, near Munich, Germany, assignor to Compur-Werk Friedrich Deckel O.H.G., Munich, Germany, a German firm Filed Feb. 20, 1958, Ser. No. 716,413

Claims priority, application Germany Feb. 22, 1957

6 Claims. (Cl. 95—10)

This invention relates to a photographic camera, and more particularly to the means for setting the adjustable or settable members of the camera in accordance with the exposure factors of the picture to be taken. The invention deals particularly with a camera having a built-in exposure meter and a plurality of adjustable setting members, such for example as a shutter speed adjusting or setting member and a diaphragm aperture adjusting or setting member, and possibly also a focus distance adjusting or setting member, especially if the camera is to be used in flash photography.

An object of the invention is the provision of a generally improved and more satisfactory camera of this general kind.

Another object is the provision of simple, improved, and rugged setting means so designed and constructed that when the operator manually sets or selects one of the exposure factors (e.g., the shutter speed) the other appropriate factor (e.g., the diaphragm aperture) will be automatically set in accordance with prevailing light conditions at the time the exposure is made.

A further object is the provision of a simple and inexpensive construction in which one of two or more exposure factors is set by the operator and in which the movable setting member of another exposure factor is automatically moved to one of its end positions or extreme limit positions when the camera is being made ready for a new exposure (e.g., by the winding of the film, or cocking or tensioning the shutter, or both) and is automatically moved from its end position to its proper setting in accordance with the "exposure value" prevailing at the instant of taking the picture.

A still further object is the provision of automatic setting means useful with a photoelectric exposure meter having a plurality of ranges of sensitivity.

These and other desirable objects may be attained in the manner disclosed as an illustrative embodiment of the invention in the following description and in the accompanying drawings forming a part hereof, in which:

Fig. 1 is a top plan view of a camera in accordance with a first embodiment of the invention, with parts broken away and parts in section;

Fig. 2 is a schematic vertical section through part of the construction shown in Fig. 1, on a larger scale;

Fig. 3 is a schematic front face view of the shutter assembly and associated parts, according to the first embodiment, showing the parts in the position assumed when the shutter has been cocked or tensioned but the shutter release or trigger not yet actuated;

Fig. 4 is a similar view showing the position of the parts when the shutter release has been actuated and the automatic diaphragm aperture setting mechanism has set the diaphragm to the required aperture;

Fig. 5 is a view similar to a portion of Fig. 3, illustrating a second embodiment of the invention which incorporates means for preventing the making of an exposure when the exposure meter pointer is not functioning within its normal effective range of travel;

Fig. 6 is a view similar to a fragment of Fig. 5, with the parts in a different position; and Fig. 7 is a similar view with the parts in still another position.

The same reference numerals throughout the several views indicate the same parts.

The invention will be explained by way of example in connection with a still camera, although certain features of the invention are applicable also to cameras of other kinds, such as motion picture cameras. Except for the features mentioned below, the camera and its shutter assembly may be of any known type, the details of construction being unimportant so far as the present invention is concerned. Thus the camera may include a body indicated in general at 10, having a lever 12 which, when swung manually, serves to transport or advance the film through a distance of one frame or exposure area, and simultaneously cocks or tensions the shutter. There is a film rewind knob 14, and a shutter release 16 in the form of a plunger on the camera body, depression of the plunger serving to initiate the actual exposure operation of the previously cocked or tensioned shutter, which is preferably of the objective type.

The camera also has a photoelectric exposure meter powered by a photocell 18 mounted on the front wall of the camera to receive light from the object being photographed. To enable the exposure meter to operate in a plurality of sensitivity ranges, it may have a movable mask in the form of a hinged flap 18a. When the flap is in the open position shown in Figs. 1 and 3, the photocell receives direct light over its entire area, and thus operates in its range of greater sensitivity, suitable for relatively dim light. When the mask 18a is in closed position, the photocell receives light only through a relatively small aperture in the mask, so that the exposure meter operates in its range of lesser sensitivity, suitable for relatively bright or intense light. Through suitable circuit wires, the electric current from the photocell is conducted to the movable operating mechanism of the exposure meter, indicated in general at 20. Conveniently the meter is of the moving coil galvanometer type, the current flowing through a coil 20a mounted for rotation within the magnetic field of a permanent magnet 20b, the coil being spring loaded in one direction so that the deflection of its pointer 22 from a zero or starting position is a function of the current flowing through the coil, which in turn is a function of the light falling upon the photocell 18. The construction of the meter is well known per se.

Mounted on the front of the camera body 10 is a shutter assembly or unit of the objective type, the casing of the shutter itself being indicated at 24. At the front of the shutter is a focusing lens mount 26 which rotates as usual about the optical axis of the shutter assembly as an axis of rotation, in order to focus the lens carried by the mount 26 upon objects at various distances from the camera. The shutter has the usual speed setting or adjusting ring 28 which, upon rotation about the optical axis as a center, serves to adjust the duration or speed of exposure. The ring 28 carries the shutter speed scale 30 which is read in conjunction with a fixed reference mark 32 on the stationary front wall of the shutter.

Within the shutter casing 24 are the usual shutter blades 34 pivoted for opening and closing movements and driven through such movements by the usual main drive member or "master member" as the latter runs down from a cocked or tensioned position to a rundown or rest position. The shutter is also provided with the usual adjustable iris diaphragm leaves or blades 36 which can be set or adjusted to various different diaphragm aperture settings by turning a diaphragm setting ring 38, rotatable about the optical axis as a center and coupled for rotation with a coaxial diaphragm control ring 40, e.g., by means of a radial arm 39 on the ring 38 which engages in a driver slot 41 of the ring 40. This control ring 40 is rotatably supported on a shoulder on the rear of the shutter housing 24, and has a rearward projection 42 which lies in the path of a mating projection 43 of a cocking or tensioning ring 44 rotatable concentrically with the optical axis and driven from the film transport crank by any conventional gearing indicated in general at 46. The ring 44 is rotatably supported on the front of the camera and is under the influence of a spring 45 which tends to turn it counterclockwise (when viewed from the front as in Fig. 3) to a normal rest position.

When the film winding lever 12 is operated to move the film the required distance for a new picture, the tensioning ring 44 is turned through a fraction of a revolution. This motion of the ring serves to cock or tension the master member of the shutter (through suitable connections known per se and not here shown) and also serves, through engagement of the parts 43 and 42, to turn the diaphragm control ring 40 and setting ring 38 to one of their end or extreme limit positions, preferably the end position in which the diaphragm leaves are fully open to maximum aperture as seen in Fig. 3. This position is determined by contact of a shoulder on the ring 40 with a fixed stop pin 47. When the rings 40 and 38 reach this extreme limit position, they are latched in this position by a latching nose 48 which drops into a notch 50 of the control ring 40. The tensioning ring 44, gearing 46, and film transport lever 12 then return to their original rest positions under the influence of a return spring, not shown. The master member of the shutter remains latched in its cocked or tensioned position until the release or trigger indicated diagrammatically at 52 is actuated to release the master member latch so that the master member, under the influence of its own tensioned power spring, runs down to its rest position and opens and closes the shutter blades 34 at a speed determined by the adjusted position of the speed setting ring 28.

The actuation of the shutter release or trigger 52 and the unlocking of the diaphragm control ring 40 are accomplished by movement of a lever 54 pivoted in the shutter casing on a pivot 56 and urged toward latching position by a spring 58. The lever extends forwardly from the camera casing into the shutter assembly and carries the latching nose 48. The forward end of the lever engages an inclined cam surface 52a on the shutter trigger or release member 52. When the release plunger 16 on the camera body is depressed against the force of its spring which normally tends to elevate it, an inclined cam surface 60 on a lateral extension of the plunger engages the lever 54, swings it in a counterclockwise direction (viewed from above as in Fig. 1) on its pivot 56 against the force of its spring 58, and withdraws the latching nose 48 on the lever from the latching notch 50 of the ring 40, so that the ring starts to turn counterclockwise (viewed from the front as in Fig. 3) under the influence of its spring 45. A little later in the motion of the lever 54, it engages the cam surface 52a and trips the shutter trigger 52 to make the exposure.

In the somewhat schematic illustration in Fig. 3, the latching nose 48 moves radially away from the optical axis of the shutter, when the release plunger 16 is depressed, and the radial movement of the forward end of the lever 54 also acts upon the cam surface 52a of the shutter trigger 52.

On the control ring 40 there are several locking notches 62, any one of which may be engaged by a locking pin 64 pressed toward effective locking penetration into the notches by a spring 70. There is at least one notch for each of the aperture graduations of the diaphragm aperture scale, which scale normally contains the usual f number graduations in a series in which each value differs from the preceding value of the series by a factor of approximately the square root of 2, as is customary in photographic shutters. Thus for example the diaphragm aperture scale (at least theoretically present on the shutter assembly, even if not actually present thereon) may have successive values of 2.8, 4, 5.6, 8, 11, 16, and 22. Actually, there are preferably a greater number of the locking notches 62, corresponding to intermediate positions of the diaphragm aperture control ring 40, between the respective full stops or full scale positions, as well as corresponding to the scale positions themselves. In the actual construction, the locking notches 62 are preferably formed in the rear face of the diaphragm control ring 40, and the locking pin 64 moves into and out of the locking notches in a direction parallel to the optical axis, as correctly shown in Fig. 1. In the diagrammatic or schematic representation in Fig. 3, however, the locking pin has been shown, for the sake of clearness, as moving radially with respect to the optical axis.

The locking pin 64 has a flange 66, and the pin is guided for longitudinal movement in the guide bearing 68 fastened to a fixed part of the camera housing. The flange 66 constitutes an armature for the pole pieces 74 of a permanent magnet system indicated in general at 72, and having demagnetizing coils 72a surrounding the legs of the magnet. The attraction of the permanent magnet (when no current is flowing through the demagnetizing coils 72a) is sufficiently great to hold the flange 66 of the locking pin 64 in contact with the pole pieces 74, against the force of the spring 70. The diaphragm control ring 40 can now be turned freely during the cocking or tensioning operation. However, when a current flows in the proper direction through the demagnetizing coils 72a, the magnetic force of the magnet is decreased to a sufficient extent so that the spring 70 can pull the flange 66 away from the pole pieces 74 of the magnet assembly, thus forcing the locking pin 64 into whichever one of the notches 62 happens to be opposite the locking pin at the moment.

The source of current for the demagnetizing coils may be, for instance, a battery 76. As may be noted schematically from Fig. 3, the circuit may extend from one side of the battery to the demagnetizing coils 72a, through these coils, thence through a conductor 78 to a wiper arm 80 mounted on and moving with the diaphragm control ring 40. As the control ring rotates, the wiper arm 80 wipes successively over one after another of the stationary contact plates 82a, each individually connected to one of a series of conductors 82 which lead to a second series of contact plates 82b arranged close to the light meter unit 20 in such position that the meter pointer 22 normally swings freely in a plane slightly above the contact members 82b and out of contact with all of them, but the pointer 22 is sufficiently resilient so that it may be deflected downwardly to make electrical contact with whichever one of the contact plates 82b happens to be opposite it at the moment.

From the contact plates 82b, the circuit is completed through the movable pointer 22 of the exposure meter (when depressed into contact with one of the plates 82b) and thence through the contact member 84 which is mounted on the lower end of the release plunger 16, and thence through the conductor 86 back to the second side of the battery 76.

In the simplified schematic illustration, the contact plates 82a are shown as being arranged at one side of the shutter assembly. In the actual assembly, these contact plates are preferably arranged in the camera body, and the wiper arm 80 on the diaphragm control ring 40 extends rearwardly from the shutter assembly so as to make appropriate wiping contact with the contact plates in the camera body. Of course all parts of the electric circuit are appropriately insulated from other metallic parts of the camera or the shutter assembly, which might interfere with proper functioning of the circuit. Thus for example the wiper arm 80 is mounted on an insulating block on the ring 40, and an intermediate insulating layer 16a can be provided at an appropriate place on the release plunger 16. The simplified illustration also shows only seven contact plates in each of the series 82a and 82b, corresponding to the seven graduations of the diahpragm aperture scale 88, from f:2.8 to f:22, inclusive. However, in actual practice there are preferably a greater number of these contact plates, corresponding not only to the full stop subdivisions of the diaphragm scale, but also to various intermediate positions between full stops.

The contact plates 82b should preferably be arranged so close to each other, or possibly in overlapping relation to each other, so that in every position of the meter pointer 22 within its effective swinging range of operation, the pointer will be opposite one of the contact plates 82b, in such position that when the plunger 16 is depressed and the pointer 22 is deflected or flexed downwardly, it will make electrical contact with one or another of the contact plates 82b. In all events, even if the adjacent contact plates 82b are not in overlapping relation to each other, the joints between them are at least arranged so narrow that they are bridged by the width of the pointer 22. The contact plates 82a are so oriented with respect to the wiper arm 80 on the diaphragm control ring 40, and this wiper arm is so oriented with respect to the locking notches 62, that when the diaphragm control ring 40 is turned to a position corresponding to any particular diaphragm aperture setting, a locking notch 62 for that diaphragm setting will be opposite the locking pin 64, and the wiper arm 80 will be in contact with the particular one of the contact plates 82a which is electrically connected by one of the circuit wires 82 to the contact plate 82b which will be directly under the meter pointer 22 when the meter pointer points to the same diaphragm aperture on the scale 88.

The meter 20, which controls the position of the pointer 22, is acted upon by the current produced by the photoelectric cell 18, upon incidence of light coming from the object to be photographed. This current, however, is modified in accordance with the value of the exposure duration or shutter speed which has been set by adjustment of the shutter speed ring 28, this being accomplished for instance by an adjustable electrical resistance arrangement as will be described in further detail below.

An insulating ring 90 is rotatably supported on or in the shutter housing 24, for rotation concentrically with the optical axis, and is coupled with the shutter speed setting ring 28 by means of a resilient and releasable catch tongue 92 which engages in one or another of a series of notches 94 in the rear edge of the speed setting ring 28 and which can be released from the notch in which it is seated and rotated to place it in any other desired notch, by deflecting it rearwardly parallel to the optical axis, as will be apparent from Fig. 1. The tongue 92 thus constitutes a resilient or displaceable coupling, for coupling the insulating ring 90 to the shutter speed setting ring 28 to turn therewith. By turning the insulating ring 90 to various positions of orientation with respect to the shutter speed setting ring 28, various different film speeds or film sensitivities can be taken into consideration. For this purpose, a film speed scale 98 is marked on a portion of the shutter speed setting ring 28, and is read in conjunction with a mark 96 associated with the tongue 92 on ring 90. The film speed or sensitivity scale may be graduated in any suitable units according to any recognized film sensitivity rating system, the graduations here shown being those of the so-called DIN system widely used in Europe.

In Fig. 1, the resilient catch system 92, 94 is shown as it actually is in practice. In Fig. 3 the catch system is indicated merely schematically or diagrammatically, as lying to one side of the periphery of the shutter speed setting ring 28, in order to make the diagram easier to read. On the insulating ring 90 there is an electrical resistance 100, one end of which is electrically connected at 102 with a current-conductive slip ring 104 which is fixed to the ring 90 and is concentric to the rings 28 and 29. This slip ring 104 makes contact with a stationarily mounted wiper arm 106 which is electrically connected by the conductor 106a to one side of the moving coil 20a of the meter 20.

The resistance 100 makes electrical contact alternately with one or the other of the stationarily mounted wiper arms 108 and 110, which are used alternately depending upon the position of the senitivity-controlling mask or flap 18a of the photoelectric cell 18. A switch blade 18c is connected to the mask 18a to swing therewith, in such position that when the mask is open as seen in Fig. 3, the switch member 18c will make contact with a conductor 108a leading to the wiper arm 108. When the mask 18a is swung down to its closed position, placing the photocell 18 in its low sensitivity range, the switch member 18c is shifted to a position out of contact with the conductor 108a and in contact with the conductor 110a leading to the wiper arm 110.

The distance between the two wiper arms 108 and 110 is slightly greater than the length of the resistance 100, so that both wiper arms cannot make contact with the resistance at the same time. However, when the shutter speed adjusting ring 28 (and the ring 90 with it) are turned, one wiper arm will make contact with the resistance 100 just after the other wiper arm leaves the resistance. The position of the wiper arm 106 with respect to the slip ring 104 is immaterial with respect to the position of the resistor 100. Thus the wiper 106 may make contact with the slip ring 104 in any peripheral position of the member 90, and in all adjusted positions the arm 106 is electrically connected through the slip ring 104 and the connection 102, to the resistance 100.

One side of the photocell 18 is connected through the above mentioned switch arm 18c to one or the other of the conductors 108a and 110a, as above mentioned, while the other side of the photoelectric cell circuit is connected by the conductor 18d to the second side of the moving coil 20a of the meter 20. The opposite side of the moving coil is connected by the conductor 106a to the wiper arm 106.

With this arrangement, the deflection of the meter pointer 22 is a function of the amount of light falling on the photocell 18, but is influenced also by the speed for which the shutter is set, and by the film speed or film sensitivity adjustment. As is well understood by those skilled in the photographic art, and particularly by those who are acquainted with the modern concept of an "exposure value" setting (fully explained in the copending patent application of Kurt Gebele, Serial No. 389,775, filed November 2, 1953, now Patent 2,829,574, granted April 8, 1958), the exposure value for which a shutter assembly should be set at a given moment is a function of the illumination of the object to be photographed and preferably also taking into account the film speed of film sensitivity, and a given exposure value denotes a relative relationship between shutter speed and diaphragm aperture but is independent of the absolute values of either of these two factors of shutter speed and diaphragm aperture. If the shutter speed is increased (to make an exposure of shorter duration) the diaphragm aperture can be changed to a compensating or complementary extent (increasing the area of the aperture or decreasing the numerical scale number of f number of the aperture) without changing the exposure value. Thus for any given exposure value, there are several possible settings of shutter speed and diaphragm aperture, all corresponding to the same exposure value. To enable the effective use of the exposure value concept in a simple manner, the shutter speed graduations on the shutter speed adjusting ring 28 are arranged linearly (that is, successive graduations are equally spaced angularly, and differ from each other by the same factor, although the numbers may be rounded off for convenience) and the diaphragm aperture adjusting parts are also arranged for actuation according to a linear law, so that if a diaphragm aperture scale were provided in connection with the rotary ring 40 (although it is not actually necessary to provide such a scale) this scale would likewise be linear, successive full stop graduations being equally spaced from each other and each differing from the previous one by a constant factor. Of course the numbers on the shutter speed scale and the diaphragm aperture scale can, for convenience, be rounded off to easily remembered round numbers rather than given in their exact theoretical values.

The operation of this form of the invention is as follows: When the film is loaded into the camera, the operator sets the film speed adjusting ring 90 (by means of the finger piece 92) for the film speed or sensitivity of the particular kind of film which is loaded. In the example shown in the drawing, the parts are set for film with a DIN speed rating of 18. This adjustment remains unchanged until the camera is loaded with a different kind of film.

When a picture is to be taken, the film winding lever 12 is operated to feed a fresh supply of film into the focal plane of the camera. Through the gearing 46, the motion of the arm 12 turns the ring 44 which serves to cock or tension the shutter master member, and also turns the diaphragm control ring 40 to its end or limit position shown in Fig. 3, and the ring 40 remains latched in this position by the latching nose 48 seating in the notch 50, while the ring 44 and the film winding handle 12 return to their initial rest positions.

The operator now selects a shutter speed which he deems appropriate for the picture to be taken, e.g., a shutter speed of 4, meaning ¼ of a second, which is the speed setting shown in Fig. 3. Assuming for the moment that the light is relatively dim so that the photocell should operate at its maximum sensitivity range, the pivoted mask 18a is moved to the open position shown in Fig. 3. The light falling on the photocell now generates a current which passes through the coil 20a of the meter 20, causing deflection of the pointer 22. In series with the coil of the meter is the resistor 100, which thus influences the flow of current through the circuit and thus takes into account both the film sensitivity and the shutter speed setting. Let it be assumed that the current causes the pointer 22 to be deflected to a position opposite the numeral 4 of the diaphragm aperture scale 88, which is the position shown in Fig. 3. Thus the meter indicates that, for the particular light conditions existing, and for the particular film sensitivity and shutter speed already set on the members 90 and 28, respectively, the picture should be taken with a diaphragm aperture of $f:4$. If the shutter speed setting ring 28 (and the ring 90 with it) were turned clockwise through one graduation or division, to set the shutter for a faster exposure of ⅛ second rather than ¼ second, it is seen that a greater length of the resistor 100 would be operatively interposed in the electrical circuit, in series with the coil of the meter 20, so that less current would flow through the circuit and the pointer 22 would be deflected only as far as the graduation 2.8 of the scale 88, for example, thus indicating that for such a shutter speed setting, the diaphragm aperture should be set at $f:2.8$ instead of $f:4$. Similarly, if the shutter speed setting ring 28 were turned counterclockwise through one space or scale graduation from the position shown in Fig. 3, to make an exposure of lower speed or longer duration, it is apparent that a shorter length of the resistor 100 would be operatively interposed in the meter circuit, so that a greater current would flow, and the pointer 22 would be deflected further from its zero or rest position, to a higher number on the scale 88, indicating that a smaller diaphragm aperture should be used.

Having set the shutter speed adjustment for the particular speed which he has selected, the operator now depresses the plunger 16 when he is ready to make the exposure to take the picture. The downward motion of this plunger causes the presser foot 84 thereon to engage with the meter pointer 22 no matter in what deflected position the pointer may be at the moment, and bend the resilient pointer downwardly into electrical contact with whichever one of the contact plates 82b happens to be beneath the pointer 22 at the moment. In the example shown in Fig. 3, it is the contact plate 82b corresponding to a diaphragm aperture of $f:2.8$ which is beneath the pointer 22, and thus when the plunger 16 is depressed, the meter pointer will make electrical contact with the contact plate 82b connected through the wire 82 (II) to the corresponding one of the contact plate 82a, which is the second one of such plates, counting from the left end of the series.

The downward motion of the plunger 16 also serves, through the cam surface 60, to swing the lever 54, but does not move this lever appreciably until after the meter pointer 22 has been brought into contact with the contact plate 82b. The first part of the swinging movement of the lever 54 serves to withdraw the latching nose 48 from the notch 50 of the ring 40, so that the spring 45 now begins to turn the diaphragm control ring 40 in a counterclockwise direction, and the electrical wiper arm 80 mounted on the ring 40 begins to sweep over the various contact plates 82a. But at this moment, only the second contact plate from the left end is energized (through the connection effected by the pointer 22) and all of the other contact plates 82a are "dead," that is, are not in the effective electrical circuit. So when the wiper arm 80 passes the first contact plate 82a, nothing happens, but as soon as it reaches the second or energized contact plate 82a, the wiper arm 80 completes the electrical circuit through the magnet assembly 72. Current now flows through the demagnetizing coils 72a, thereby demagnetizing the magnet pole 74 sufficiently so that the spring 70 can draw the flange 66 away from the magnet pole 74, and move the locking pin 64 longitudinally into the notch 62 which is opposite it at this moment, which is the notch corresponding to a diaphragm aperture setting of $f:4$. This position of the locking pin and of the diaphragm control ring 40 is shown in Fig. 4. As the plunger 16 is pressed further down, the lever 54 is swung to a further extent, so that it acts on the cam surface 52a of the shutter trigger 52 and moves this shutter trigger to release the master member of the shutter, which now runs down from its tensioned or cocked position to its rest position, thereby opening and closing the shutter blades 34 to make the exposure. The lever 54 does not operate the trigger 52, however, until after the diaphragm control ring 40 has completed its effective movement and has been stopped by the locking pin 64.

Thus, with this arrangement, the shutter speed is first selected manually by the operator, and then the diaphragm aperture is automatically set to give the required exposure value at the instant that the exposure is made. A very simple and effective camera setting means is thus provided, needing only a minimum amount of knowledge on the part of the operator, and being capable of use by an almost totally inexperienced person.

Instead of having the diaphragm control ring 40 movable freely in its reverse direction under the influence of its spring 45 (until stopped by the locking pin 64) it may be desirable under some circumstances to provide an escapement anchor or vibrating pallet which engages in escapement teeth formed on an appropriate part of the ring 40, so as to slow down the return motion of the ring 40. In this way, small time delays of a few milliseconds in the functioning of the electrical system to operate the pin 64, will not result in erroneous positioning of the diaphragm control ring, which will always be locked in the proper position by the pin 64, if its motion is slowed down enough to take into account the brief time lag in the electrical system and the inertia of the moving parts.

If the diaphragm mechanism is designed according to a linear law, so that equal angular movements of the ring 40 serve to change the aperture by a given factor, then of course the contact plates 82a are arranged at equal angular intervals around the optical axis. However, the other contact plates 82b which make contact with the pointer 22 are of different lengths or otherwise arranged at different angular spacing around the axis of rotation of the pointer, in order to take into account the well known non-linearity of the indications of a photoelectric exposure meter, especially near the ends of the scale.

If the operator observes no deflection of the pointer needle 22, with the mask 18a in the open position as shown in Figs. 3 and 4, he will know that the light is so strong that the needle has already been deflected past its extreme position indicating the smallest available diaphragm aperture, so that the particular shutter speed which has been selected is not appropriate. Therefore, he must shift the mask 18a to the closed position, putting the exposure meter mechanism in the lower sensitivity range, and he must turn the shutter speed setting ring 28 to select a higher shutter speed. The wiper arm 110 is now the one which makes contact with the resistor 100, and the wiper arm 108 is out of contact therewith. The closing of the mask 18a should bring the pointer 22 back into the visible effective range, and the parts now operate similarly to the manner previously described. Similarly, if the operator attempts to take a picture with the mask 18a in closed position, and is not able to observe any deflection of the pointer 22, he will know that there is insufficient light to use even the largest diaphragm aperture, at the particular shutter speed selected, and so he must open the mask 18a to the high-sensitivity position, and much turn the speed adjusting ring 28 to select a slower shutter speed for a longer exposure. In general, in scenes of normal brightness, and with film of average commercial sensitivity or speed, the picture can usually be taken in the high sensitivity range of the meter, with the mask 18a in the open position. When the mask is open, the exposure meter will preferably accommodate a brightness range up to about 500 lux, and with the mask closed, will accommodate a range from about 500 to 50,000 lux.

Of course it is possible to apply this electrical control system of the diaphragm aperture, to a shutter which operates always at a given set speed, without having the feautre of preselection of shutter speed by the operator. This would accommodate most scenes of average brightness, but would not have the complete flexibility which is inherent in the preferred form of the invention, where the shutter speed is first selected and then the diaphragm aperture is automatically set in accordance with the shutter speed which the operator has chosen.

The invention enables the operator to select one of the two related factors of shutter speed and diaphragm aperture, and set the same manually, while the mechanism of the present invention will automatically set or adjust the other one of these two factors, at the time the exposure is made. In the preferred form herein disclosed, it is the shutter speed factor which is selected and manually set by the operator, and the diaphragm aperture factor which is set automatically by the mechanism. It is preferred to utilize the fully open or maximum aperture position as the end or limit position from which the setting motion starts, because such a construction can be used in a particularly easy manner in, for instance, a single lens reflex camera where the diaphragm as well as the shutter blades must be brought to open position for focusing purposes, before the picture is taken. For use in such a camera, the diaphragm leaves can be moved to fully open position in the manner already described above, while the shutter blades can be opened for viewing and focusing, in the manner disclosed in the copending patent application of Kurt Gebele, Serial No. 509,929, filed May 20, 1955.

With the present invention, the visible diaphragm aperture scale can be omitted from both the shutter assembly and the camera body, since such a scale is not necessary so far as setting the diaphragm is concerned. However, it is convenient to supply such a scale as shown at 88, in connection with the pointer 22, for verification purposes and also for the operator to take the diaphragm aperture into consideration under conditions where he is interested in depth of field.

Another embodiment of the present invention is illustrated in Figs. 5–7 of the present drawings, which are to be read in conjunction with Figs. 1–4, since Figs. 5–7 are intended to illustrate only those features which differ from those of Figs. 1–4. The embodiment of Figs. 5–7 provides, in addition to the previously described structure, an additional lock or safety device which prevents faulty operation of the camera in case the brightness of illumination is too great or too small for the particular range at which the photoelectric exposure meter is operating.

Behind the diaphragm control ring 40 there is another ring 200 which rotates on the shutter casing 24 coaxially with the optical axis. It is brought into cocked or tensioned position by the above described cocking device, i.e., from the motion of the cocking ring 44. In the cocked or tensioned position, the two rings 40 and 200 are both held by the above mentioned locking nose 48 on the lever 54, which nose 48 engages a latching notch in the ring 200 as well as the latching notch in the ring 40. The ring 200 is loaded by a spring 202 which tends to turn it back in a counterclockwise direction from its tensioned and latched position, to its initial or rest position.

The ring 200 also has on its periphery an escapement toothed section 204, engaging an escapement anchor or oscillating pallet 206 so that the running down motion of the ring 200, under the influence of its spring 202, is retarded with respect to the running down of the ring 40 after the two rings are released by the latching nose 48. Also the ring 200 has an oblique control surface or cam surface 208 which, toward the end of its running down motion, comes into engagement with the shutter release or trigger member 52' and swings the latter in a releasing direction from the normal position shown in Fig. 5 to the released position shown in Fig. 6, during which swinging motion the member 52' unlatches the master member of the shutter, so that an exposure is made.

At one side of the ring 200 there is pivoted, on a fixed pivot in the shutter assembly, a locking lever 210 in the shape of a bellcrank influenced by the spring 212 in a counterclockwise direction. In the normal rest position of the parts as shown in Fig. 5, the circumferentially extending arm 210a of the locking lever 210 is out of the path of movement of the projection 200a on the ring 200. But when the locking lever 210 is turned clockwise against the force of its spring 212, then its arm 210a lies in the path of the projection 200a and stops the downward running movement of the ring 200 a little before its normal rest position. Another arm 210b on the locking lever 210 extends approximately radially into a position to be engaged and shifted by a shoulder 40a on the diaphragm control ring 40 just as the latter reaches its extreme or limiting position in a running-down direction.

In a normal case, when the light falling on the photocell 18 is sufficient to deflect the meter pointer 22 to any of its intermediate positions between its two extreme positions, the locking pin 64 operates to stop the counterclockwise rotation of the ring 40 at some intermediate point before it reaches its extreme or limiting position in a counterclockwise direction, and thus the shoulder 40a on the ring 40 never comes into contact with the arm 210b of the locking lever 210, and does not swing this locking lever on its pivot. Hence the locking lever does not obstruct the somewhat slower running down movement of the ring 200, and the ring completes its running down movement, at the end of which the cam surface 208 on the ring engages the shutter trigger 52' and swings it counterclockwise on its pivot, releasing the master member to make an exposure.

When the light falling on the photocell is too dim to cause deflection of the pointer 22 from its initial rest position to at least the first diaphragm aperture setting position, or when the light is too bright and deflects the pointer past the last diaphragm aperture setting position and on to its extreme limiting position, no circuit plate 82b will be in line with the pointer 22, and thus no one of the circuit conductors 82 will be energized. Hence the pin 64 will not be released, the diaphragm control ring 40 will not be stopped at any intermediate position, and it will continue on beyond its normal range of travel, a slight additional distance sufficient to engage the arm 210b of the locking lever 210, and swing the locking lever slightly on its pivot so that the arm 210a thereof will stand in the path of the projection 200a on the ring 200. This will stop the running down motion of the ring 200 a little short of its normal rest position, so that the ring 200 will move only to the position shown in Fig. 7, where the cam portion 208 has not yet swung the shutter trigger 52'. Thus the master member of the shutter is not released, and no picture is taken. This saves wastage of film, and warns the operator that the exposure meter is operating in the wrong sensitivity range (or else that the light is too dim even for the highest sensitivity range).

The operator can now disengage the film advance member 12 (by means known per se) and operate the member 12 once more without feeding film, in order to cock or tension the shutter assembly again, and can once more press the release member 16 to make an exposure, after having first adjusted the mask 18a to change the meter sensitivity as may be necessary.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

A cam or other suitable part on the tensioning or cocking ring 44 moves the locking pin 64 to unlocked position at the beginning of the cocking operation.

What is claimed is:

1. A photographic camera having at least two adjustable members movable through predetermined ranges to set the camera for making an exposure, means for moving one of said adjustable members to and latching it in an extreme position at one end of its range of travel, springs means tending to move said one of said members through a return movement back to the opposite end of its range of travel, and a built-in exposure meter having a pointer assuming various positions in accordance with the incident illumination, characterized by a locking member for stopping said return movement of said one adjustable member at an intermediate point, a magnet for holding said locking member in an ineffective position, and electrical circuit means including said magnet and said pointer of said exposure meter and further including a contact member carried by said one adjustable member for closing said circuit means at a point in said return movement dependent on the position of said pointer, said locking member being released from said magnet when said circuit means is closed.

2. A photographic camera comprising at least a first and a second adjusting member each movable through respective ranges, means for moving said first adjusting member to a position at one end of its range of travel and for latching it in such position, spring means tending to move said first member through a return movement toward the other end of its range, an exposure meter having a pointer movable to various positions, means for modifying the position of said pointer for given illumination conditions in accordance with the setting of said second adjusting member, a plurality of parallel electrical circuits, means for electrically energizing a selected one of said circuits in accordance with the position of said pointer while leaving others unenergized, and means operated through the particular circuit which is energized for stopping said return movement at an intermediate point.

3. A photographic camera having at least a first and a second adjusting member movable through predetermined ranges to set the camera for making an exposure, means for moving said first adjusting member to and latching it in an extreme position at one end of its range of travel, spring means tending to move said first adjusting member through a return movement back to the opposite end of its range of travel, an exposure meter having a pointer, means for modifying the position of said pointer for given illumination conditions in accordance with the setting of said second adjusting member, a plurality of spaced notches carried by said first adjustment member, a locking pin urged into engagement with said notches for stopping said first adjusting member at different intermediate points in said return movement, a magnet for holding said locking pin in released position, and a plurality of electrical circuits each including said magnet and each arranged to be completed at a different point in said return movement of said first adjusting movement to release said locking pin for latching engagement with one of said notches.

4. A construction as defined in claim 3, wherein said electrical circuits include a common contact member carried by said first adjusting member for movement therewith, said electrical circuits further including contact plates arranged to be engaged in succession by said contact member and a series of gaps arranged within the range of movement of said exposure meter pointer to be closed selectively by displacement of said pointer.

5. A construction as defined in claim 3, including plunger means for releasing said first adjusting member for said return movement and for engaging said pointer to cause the displacement thereof.

6. A photographic camera having at least a first and a second adjusting member movable through predetermined ranges to set the camera for making an exposure, means for moving said first adjusting member to and latching it in an extreme position at one end of its range of travel, spring means tending to move said first adjusting member through a return movement back to the opposite end of its range of travel, an exposure meter having a pointer, means for modifying the position of said pointer for given illumination conditions in accordance with the setting of said second adjusting member, a contact member carried by said first adjusting member for movement therewith, a plurality of electrical circuits arranged to be engageable in sequence by said contact member and to be selectively engaged by said pointer, a locking member for stopping said return movement of said first adjusting member at an intermediate point, a magnet coupled with said electrical circuits for holding said locking member in ineffective position, and means for moving said pointer into engagement with one of said electrical circuits and for releasing said first adjusting member for said return movement, said contact member engaging one of said electrical circuits to complete the circuit and deenergize said magnet sufficiently to release said locking member for movement into engagement with said first adjusting member.

References Cited in the file of this patent

UNITED STATES PATENTS

| | | |
|---|---|---|
| 2,061,909 | Karg | Nov. 24, 1936 |
| 2,282,659 | Kun | May 12, 1942 |
| 2,325,463 | Axler | July 27, 1943 |
| 2,662,457 | Fairbank | Dec. 15, 1953 |